United States Patent
Uemura et al.

(10) Patent No.: US 7,533,687 B2
(45) Date of Patent: May 19, 2009

(54) CAPACITY CONTROL VALVE

(75) Inventors: Norio Uemura, Tokyo (JP); Toshiaki Iwa, Tokyo (JP); Katsuya Shirai, Tokyo (JP); Keigo Shirafuji, Tokyo (JP); Yukihiko Taguchi, Gunma (JP)

(73) Assignees: Eagle Industry Co., Ltd., Tokyo (JP); Sanden Corporation, Gunma (JP)

( * ) Notice: Subject to any disclaimer, the term of this patent is extended or adjusted under 35 U.S.C. 154(b) by 0 days.

(21) Appl. No.: 10/911,557

(22) Filed: Aug. 5, 2004

(65) Prior Publication Data

US 2005/0035321 A1    Feb. 17, 2005

(30) Foreign Application Priority Data

Aug. 11, 2003    (JP) .............................. 2003-291556

(51) Int. Cl.
*F16K 31/02* (2006.01)
(52) U.S. Cl. .................... 137/375; 251/129.15
(58) Field of Classification Search ............ 251/129.15; 29/890.12, 890.132, 898.13, 890.13; 417/222.2; 137/375
See application file for complete search history.

(56) References Cited

U.S. PATENT DOCUMENTS

| | | | | | |
|---|---|---|---|---|---|
| 4,250,922 | A | * | 2/1981 | Will et al. ............... | 251/129.15 |
| 5,263,834 | A | * | 11/1993 | Sato et al. .................... | 418/178 |
| 5,326,362 | A | * | 7/1994 | Shetty et al. ................. | 427/250 |
| 6,196,808 | B1 | * | 3/2001 | Taguchi ................... | 417/222.2 |
| 6,443,707 | B1 | * | 9/2002 | Kimura et al. ................. | 251/62 |
| 6,481,976 | B2 | * | 11/2002 | Kimura et al. ............. | 251/61.5 |
| 6,637,228 | B2 | * | 10/2003 | Umemura et al. ...... | 251/129.02 |
| 6,682,314 | B2 | * | 1/2004 | Umemura et al. .......... | 251/61.5 |
| 6,684,654 | B2 | * | 2/2004 | Fukasaku et al. ....... | 251/129.15 |
| 6,927,656 | B2 | * | 8/2005 | Iwata et al. ............. | 251/129.15 |
| 2003/0014990 | A1 | * | 1/2003 | Fukasaku et al. ....... | 251/129.01 |

FOREIGN PATENT DOCUMENTS

| | | |
|---|---|---|
| JP | 2000-291540 A | 10/2000 |
| JP | 2000-291542 A | 10/2000 |
| JP | 2001-214256 A | 8/2001 |
| JP | 2002-021720 A | 1/2002 |
| JP | 2003-035269 A | 2/2003 |

\* cited by examiner

*Primary Examiner*—John Bastianelli
(74) *Attorney, Agent, or Firm*—Arent Fox LLP

(57) ABSTRACT

An operating rod is subjected to a surface hardening heat treatment without a post finishing process which enhances a responsiveness of the operating rod by preventing powders from being attracted to a sliding surface of the operating rod. The capacitive control valve includes a solenoid rod portion communicating with a moveable core of the solenoid portion, an operating rod connected with the solenoid rod portion, the operating rod including a valve body used for opening or closing a control fluid passage hole, and a fixed core arranged opposite relative to the moveable core. The fixed core includes a guide hole defined therein which guides the operating rod through the guide hole in a freely moveable manner, the operating rod extending longitudinally through an internal bore. The operating rod being subjected to surface hardening treatment at a relatively low temperature that does not exceed 500° C.

2 Claims, 5 Drawing Sheets

CAPACITY CONTROL VALVE

BACKGROUND OF THE INVENTION

1. Field of the Invention

The present invention relates generally to a capacity control valve for variably modulating a capacity or a pressure of a process fluid in a control chamber through a valve body which is connected with an operating rod. More particularly, the invention relates to a capacity control valve in which anti-abrasion capability of the operating rod in an opening or closing action of the valve body is improved and its slide resistance is decreased where the valve body is integrally attached to the operating rod.

2. Description of the Related Art

There have been known as a relative art 1 of the present invention capacity control valves for a variable displacement type swash plate compressor. In a capacity control valve of this kind, an operating rod mounting a valve body thereon is connected with a solenoid portion or a pressure sensitive device, thus the rod results in a long structure. The operating rod is also connected with a solenoid rod which is guided in a freely slidable manner through a bore inside a fixed iron core of a solenoid portion. Further, the capacity control valve accommodates the operating rod which is integrally connected with the solenoid rod of a large longitudinal length and a small radius.

A capacity control valve 100 shown in FIG. 5 is similar to the capacity control valve of the related art 1. Therefore the related art 1 is described through FIG. 5. A valve housing 105 in FIG. 5 has a through hole which axially extends therethrough. The through hole disposes a discharge valve hole 110C, suction valve hole 110D, a first guide hole 110E, and a second guide hole 110F therein. Also a valve chamber 111 is disposed between the discharge valve hole 110C and the suction valve hole 110D. Further, a first suction pressure passage 110B1 is arranged to communicate with the suction valve hole 110D. Also a discharge pressure passage 110A is arranged to communicate with the discharge valve hole 110C. Described at the bottom of the figure is a second suction pressure passage 110B2 which is arranged to communicate with the through bore.

In the valve housing 105, a first valve housing 105A and a second valve housing 105B are integrally connected with each other at their respective end portions by means of screw thread. A spring container 120 is formed within an end portion of the first valve housing 105A. An opening end of the spring container 120 is screw-engaged with a spring seat 122. A spring means 121 is disposed between the spring seat 122 and the operating rod 101, and a spring force of the spring means 121 is adjusted by rotating the screw thread of the spring seat 122. This spring means 121 provides the operating rod 101 with a resilient, urging force which is pointing upward, as indicated in the figure.

The through hole of the valve housing 105 contains the operating rod 101 therewithin. The operating rod 101 forms an integral construction which includes a first stopper 110E which slides relative to the first guide hole 110E, a valve body 101A which is disposed within a valve chamber 111, a second stopper 101F which slides relative to the second guide hole 110F, and a solenoid rod 101C which is fitted to a rod hole 132A of the fixed iron core 132 in a freely slidable manner. The valve body 101A has valve faces thereon and the respective valve faces disposed at both end faces of the valve body 101 are brought into contact with or lifted from the opposing valve seats of the valve housing 105 to adjust the opening degree of the discharge valve hole 110C and the suction valve hole 110D, respectively.

Displacement of the valve body 101A in opening direction of the discharge valve hole 110C allows the fluid of discharge pressure in the discharge pressure passage 110A to rigorously flow into a crank case pressure passage 110G. This, at the same time, creates a movement of the valve body 101A in closing direction of the suction valve hole 110D, which throttles the fluid of suction pressure of the first suction pressure passage 110B1 flowing into the crank case pressure passage 110G. The operating rod 101 integrally built with the valve body 101A makes a movement with the first stopper 101E sliding relative to the first guide hole 110E and with the second stopper 101F sliding relative to the second guide hole 110F. Further, the valve body 101A is brought into contact with or is lifted from the valve seat. For this reason, the valve body 101A as well as the first stopper 110E and the second stopper 101F must be hardened through heat treatment to prevent wear. Also the heat treated surfaces need to be finished by a grinding process.

A solenoid portion 130 is disposed at the other end of the valve housing 105. The solenoid portion 130 consists of a fixed iron core 131, a moveable iron core 132 and an electromagnetic coil 135. The moveable iron core 132 operates through an energization of the solenoid portion 130, which forces the solenoid rod 101C to move. Movement of the solenoid rod 101C is guided by the rod hole 132A of the fixed iron core 132. A portion of the fluid of suction pressure from the first suction pressure passage 110B1 is allowed to flow into a moveable iron core chamber 136 after passing through a clearance gap on the outer perimeter surface of the solenoid rod 101C. This equalizes the suction pressure Ps inside the moveable iron core chamber 136 and the suction pressure Ps of the suction pressure fluid flowing into the spring chamber 120 through the second suction pressure passage 110B2, both of which equally act on the operating rod from its both sides.

In a capacity control valve 100 of this kind, the valve body 101A opens and closes the discharge valve hole 110C and the suction valve hole 110D in mutually exclusive a manner as the result of an upward motion of the operating rod 101 which is created by an action force being proportional to the electric current given to the solenoid portion 130 and a reaction force of the spring means 121. The mutually exclusive control of the opening and closing of the discharge valve hole 110C and the suction valve hole 110D causes the fluid of discharge pressure Pd and the fluid of suction pressure Ps to flow into a crank case of a compressor for controlling a swash plate thereof wherein the compressor is not included in the figure.

The operating rod 101 of the capacity control valve 100 needs to be arranged to have a hard surface because the operating rod 101 is subject to sliding movement relative to the first guide hole 110E and the second guide hole 110F. A valve face of the valve body 101A also requires a hard surface because the valve face is brought into contact with a valve seat. Further, the first stopper 101E and the second stopper 101F are aligned with each other in a coaxial manner in order to reduce a slide friction. Also the valve face needs to be fabricated perpendicular to the axis of the operating rod 101. In order to do so, the operating rod 101 is machined by grinding after a heat treatment process. The operating rod 101, however, has a body of large longitudinal length and the heat treatment often causes an axial bending of the rod. In addition, a small diameter of the operating rod 101 imposes difficulty on the use of grinding process. In particular, a great difficulty resides in the grinding process of the valve face to arrange the valve face perpendicular to the rod axis. This may cause a deficiency of the operating rod 101 in that the operating rod 101 is no longer able to keep up with the spring force of the spring portion 121 or the electric current of the solenoid portion 130 when the spring portion 121 acts on the operating rod 101 or the solenoid portion 130 is energized through the modulation of the current. Therefore the control of the capacity control valve 100 affects operation of the compressor.

Problems remaining in the relative art 1 and relative art 2 are clarified in the following description. In the relative art 1 (for the relative art 2, corresponding members should be referred to in FIG. 5), the fixed iron core 132 is magnetic and iron powder contained in a fluid under suction pressure Ps is attracted to an inner surface of the magnetized bore before reaching the moveable iron core chamber 136 by passing through the clearance gaps in the second guide hole 110F and in the rod hole 132A of the fixed iron core 132. The attracted iron powder remains on the slide surface and causes abrasion of the inner surface of the bore as well as of the operating rod 101 during relative sliding movement. In particular, the iron powder deposited on the second guide hole 110F of the valve housing 105 causes a trouble on the operation of the operating rod 101 (connecting rod retainer in case of the relative art 2). Also iron powder and the like tend to be accumulated in a region close to the second stopper 101F of the rod hole 132A in the fixed iron core 132. The accumulated iron powder hampers the operation of the operating rod 101. If the solenoid rod 101C and the operating rod 101 are defined as separate members and their respective contact surfaces are brought into contact with each other, the iron powder accumulated in the region close to the second stopper 101F of the rod hole 132A in the fixed iron core 132 is introduced into an interface between the two contact surfaces of the solenoid rod 101C and the operating rod 101 as the operating rod 101 operates, which deteriorates the opening/closing performance of the valve body 101A. This causes the capacity control valve 100 to lose control over the fluid under the crank chamber pressure Pc.

In a capacity control valve of this kind, the following drawbacks remain due to the arrangement constructed as above. First, an operating rod of the capacity control valve requires a quenching process as heat treatment in order to increase hardness of the slide surface for preventing wear thereof. Such a heat treatment process, however, raises problems such as axial bending or strains. Therefore, this necessitates not only a polishing process of the heat treated surface after the original heat treatment process but also a re-grinding process in order to correct the axial bending. In addition, a small radius of the operating rod makes it difficult to apply a grinding process thereto. Further, the valve face also requires to be processed by grinding after heat treatment to ensure perpendicularity of the valve face with respect to the longitudinal axis. This grinding process is also demanding due to its necessity of machining in a perpendicular direction relative to the longitudinal axis, which increase a production cost.

Further, iron powders magnetized between the solenoid rod and the rod hole of the fixed iron core are attracted to the fixed iron core and makes the solenoid rod difficult to operate normally. Such contaminants like the iron powders or the like are hard to be gotten rid of because they are introduced in a source fluid to begin with. Also wear of the fixed iron core is tough to be avoided because of the limited availability of its material. As a result, the abrasion powders attracted to the rod hole make the solenoid rod difficult to operate under a normal condition.

The present invention is introduced to resolve the above mentioned problems. A primary technical goal which this invention tries to achieve is to prevent wear in sliding motion by hardening an operating rod and to achieve dimensional accuracy for the normal operation of the operating rod. Another goal is to decrease the production cost of the operating rod. Yet another goal is to ensure the normal operation of the operating rod by preventing impurities from being attracted to between the sliding surfaces of the rod hole of the fixed core and the solenoid rod.

BRIEF SUMMARY OF THE INVENTION

The present invention is made to alleviate the above technical problems and a solution to such problems is embodied as follows. A capacity control valve retains a solenoid portion, and the capacity control valve comprises a solenoid rod portion communicating with a moveable core of the solenoid portion, an operating rod retaining the solenoid rod portion, a valve body defined in the operating rod and opening or closing a control fluid passage hole and a fixed core oppositely arranged relative to the moveable core, the fixed core retaining a guide hole, the guide hole guiding the operating rod in freely moveable a manner which longitudinally extends through an internal bore wherein the operating rod is processed at no more than 500° C. by a surface hardening treatment.

According to a capacity control valve of the present invention, the operating rod is processed at no more than 500° C. by a low temperature surface hardening treatment. The low temperature surface hardening treatment applied to the surface of the operating rod in which a surface thickness of less than $10 \times 10^{-6}$ m is processed at no more than 500° C. can provide an improved anti-abrasion, anti-sticking and a low surface roughness of the operating rod. More particularly, a sliding friction of the operating rod improves since the operating rod is free from strains caused by the heat treatment. Roundness of the operating rod after the surface hardening treatment is approximately less than $0.5 \times 10^{-6}$ m, thus a leakage of control fluid in the closing action of the valve body from a gap between the fit surfaces of the operating rod is effectively prevented. Further, anti-abrasion ability of the operating rod will improve. Machining cost of the operating rod is also decreased. Overall shape of the operating rod after the heat treatment exhibits little deformation caused by the heat treatment, and field experiments of the operating rod do not reveal any potential problem.

DETAILED DESCRIPTION OF THE INVENTION

Described below is details of the figures of preferred embodiments of a capacity control valve constructed in accordance with the principles of the present invention. All the figures explained below are constructed according to actual design drawings with accurate dimensional relations.

Figure 1:
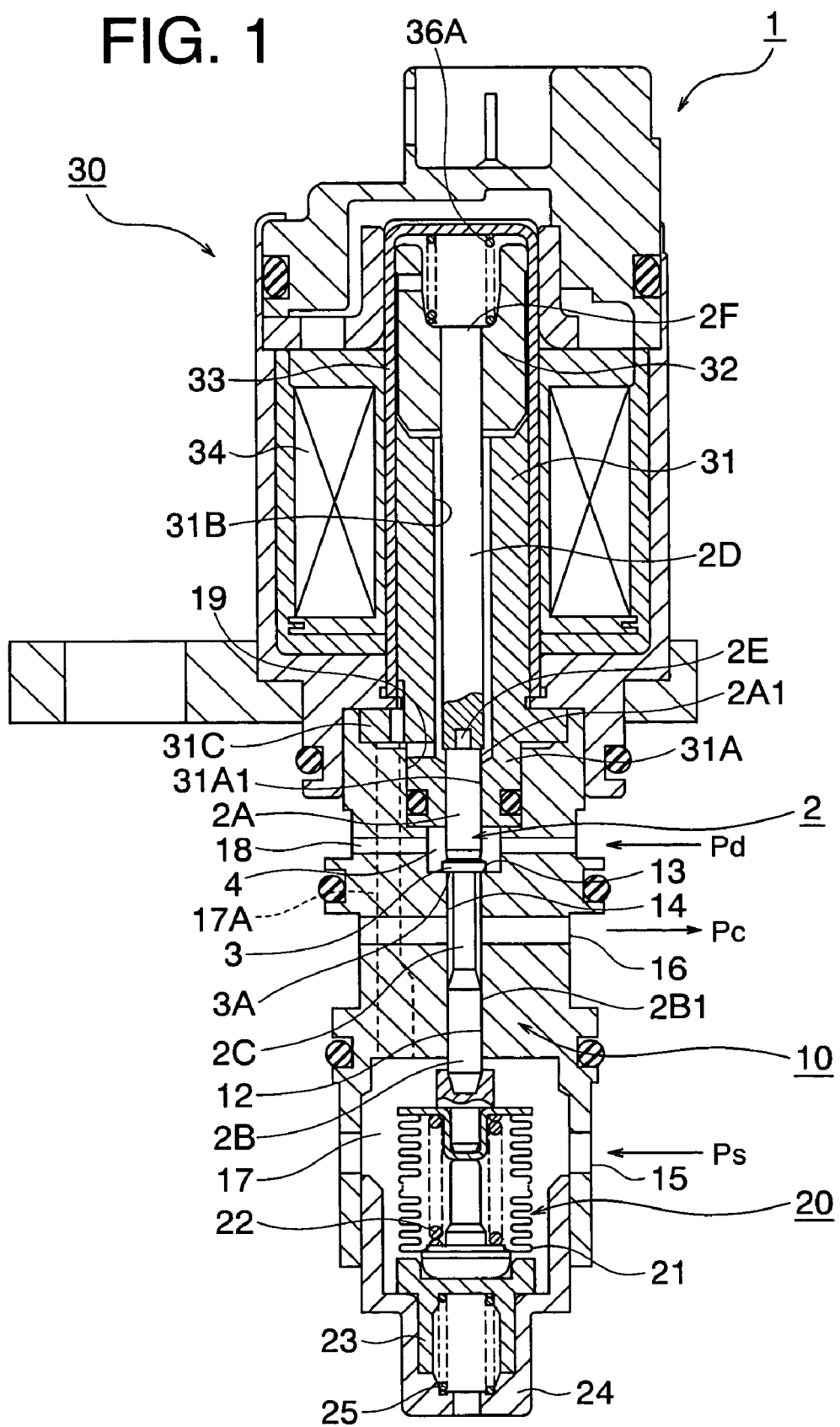
FIG. 1 is a cross sectional view of a capacity control valve as a preferred embodiment relative to the present invention.

FIG. 1 is a cross sectional view of a capacity control valve as a preferred embodiment relative to the present invention. In FIG. 1, a reference numeral 1 signifies a capacity control valve. The capacity control valve 1 disposes a valve housing 2 which forms an outer perimeter shape of the valve 1. The valve housing 10 disposes a through hole which defines respective portions of different diameters therein. The valve housing 10 is made of metal such as brass, aluminum or stainless, synthetic resin or the like.

The valve housing 10 retains an widely open end at one end of the through hole thereof. The open end is fitted with an end adjusting portion 24 which forms a pressure sensing chamber 17 therewithin. Outer circumference of the other end of the valve housing 10 forms a connecting portion with which the solenoid portion 30 is connected. The end adjusting portion 24 is fitted with the valve housing 10 at a certain relative location. However, arranging screw thread on the end adjusting portion 24 enables a desired spring force of the pressure sensing device 20 to be modulated.

The through hole of the valve housing 10 disposes a sliding hole 12 therein which communicates with the pressure sensing chamber 17 and is arranged smaller in diameter than the pressure sensing chamber 17. The through hole further retains a control fluid passage hole 14 which communicates with the sliding hole 12. Also a valve chamber 4 is disposed so as to communicate with the control fluid passage hole 14 wherein the valve chamber 4 is arranged larger in diameter than the control fluid passage hole 14. The other end of the through hole defines a mounting bore 19 which communicates with the valve chamber 4 and can be fitted to the fixed iron core (fixed core) 31 wherein the mounting bore 19 has two step shoulders and is arranged larger in diameter than the valve chamber 4. In addition, a planar valve seat 13 is defined at the interface between the valve chamber 4 and the control fluid passage hole 14. The valve seat 13 can be arranged to form a tapered surface toward the control fluid passage hole 14. By doing this, a contact width with the corner of a valve portion surface 3A can be made small.

The valve housing 10 defines a first communication passage 18 which communicates with the valve chamber 4. The first communication passage 18 communicates with a passage of a fluid under control pressure Pd, e.g., a passage of a fluid under discharge pressure (control pressure) Pd in case of a variable displacement compressor. This first communication passage 18 reaches the perimeter surface of the valve housing 10 wherein four of the first communication passages 18 are disposed in equally spaced a manner. The number of the first communication passages 18 disposed on the perimeter surface in equally spaced a manner can be three, four or such depending on necessity.

The control fluid passage hole 14 communicates with a second communication passage 16 which allows the inflow fluid under control pressure Pd to flow out to the control chamber (crank chamber 55 in FIG. 4) which is not shown in the figure. The second communication passage 16 defines a through hole extending from the outer circumference of the valve housing 10 to the control fluid passage hole 14 at two or four locations which are equally spaced along the outer circumference.

The valve housing 10 also retains a third communication passage 15 which communicates with the pressure sensing chamber 17. A fluid under suction pressure (Ps) of an external device (compressor) is introduced into the pressure sensing chamber 17 through the third communication passage 15. The outer circumference of the valve housing 10 has protruding step shoulders thereon and these protruding step shoulders at two locations dispose mounting grooves for O-ring therein.

Each mounting groove mounts an O-ring thereon to provide a seal between the valve housing 10 and an installation bore of a casing, which does not appear in the figure (see FIG. 4), with which the valve housing 10 is fitted.

The pressure sensing chamber 17 disposes a pressure sensing device 20 therewithin. A resiliently urging bellows element 21 which is made of metal forms an outer circumference of the pressure sensing chamber 17. One end of the bellows element 21 is attached to a bellows guide 23. The other end of the bellows element 21 is connected with a mounting plate in an integral manner. Further, a resiliently urging first spring 22 is disposed within the bellows element 21 and the internal chamber of the bellows element 21 is sealingly kept in a vacuum state. The bellows guide 23 is sealingly fitted to a sliding surface of the end adjusting portion 24 and is resiliently urged by a second spring 25. The bellows element 21 is made of phosphorous bronze or the like and its spring coefficient is designed to a desired value. If the spring coefficient of the bellows element 21 is not strong enough, the first spring 22 which is arranged in a coil form provides an urging force. The first spring 22 exerting an urging force in an opening direction of the valve body 3 can be disposed in some other location instead of within the pressure sensing device 20. If the first spring 22 is disposed in some other location, then the pressure sensing device 20 can be constituted by a diaphragm.

The pressure sensing device 20 is so designed that its action of expansion or contraction is determined based on a relative force balance between a resilient, urging force of the pressure sensing device 20 and a contracting force due to the suction pressure Ps. The suction pressure Ps which acts on an effective pressure receiving area of the pressure sensing device 20 produces the contraction force against the pressure sensing device 20. The valve housing 10 disposes an introduction hole 17A (represented by a broken line) which communicates from the pressure sensing chamber 17 to a large diameter portion of the mounting bore 19. The introduction hole 17A is capable of introducing an external fluid under suction pressure Ps through the pressure sensing chamber 17 into an internal bore 31B of the fixed iron core 31. The large diameter portion of the mounting bore 19 is arranged to receive a flange portion 31C. The respective slide surfaces located in the through bore of the valve housing 10 can dispose seat films thereon which are not shown in the figure. The seat films are made of a low friction material. As an example of such a low friction material, a fluoric-resin film can be coated over the slide surface. With this seat film introduced, an overall operational response of the operating rod 2 can be improved.

A joint element is fixedly attached to a concave portion of the mounting plate located at the one end of the pressure receiving device 20 wherein a protruding portion of the joint element is fixedly fitted with the concave portion. The joint element also has a concave portion therein which has a shape of truncated cone. The operating rod 2 whose one end is fittingly connected with the concave portion of the joint element extends through the through bore. The operating rod 2 retains a pressure sensing rod portion 2B which undergoes a sliding motion against the sliding hole 12. The operating rod 2 also retains a joint rod portion 2C which is integral with the pressure sensing rod portion 2B. The joint rod portion 2C is arranged smaller in diameter than the control fluid passage hole 14 such that, when the valve body 3 opens, a fluid under control pressure Pc is allowed to communicate between the control fluid passage hole 14 and the joint rod portion 2C. The operating rod 2 further retains the valve body 3 at the end portion of the joint rod portion 2C in an integral manner. The valve body 3 includes a valve seat 13 and a valve portion surface 3A. A valve body rod portion 2A extends from the valve body 3. Diameter of the valve body rod portion 2A is arranged slightly larger than that of the control fluid passage hole 14. A protruding joining portion 2E is formed at an end surface 2A2 (see FIG. 2) of the valve body rod portion 2A. The joining portion 2E of the valve body rod portion 2A is arranged to be engaged with an engagement hole disposed in a solenoid rod portion 2D. The joining portion 2E can be fabricated to a conical shape or a square rod shape with which the engagement hole of the solenoid rod portion 2D is engaged. The operating rod 2 is made of stainless steel or possibly a nonmagnetic material or special steel.

The solenoid rod portion 2D is formed a circular rod shape and retains the engagement hole at its one end which is engaged with the joining portion 2E of the operating rod 2. And the other end is fixedly connected to a fit bore of the moveable iron core (moveable core) 32. The solenoid rod portion 2D is made of stainless steel. The operating rod 2 is processed with a low temperature surface hardening treatment whose temperature is less than 530° C., more preferably less than 500° C. The moveable iron core 32 is arranged to form a conical surface at the fixed iron core 31 side. On the other hand, an opposite side of the moveable iron core 32 relative to the solenoid rod portion 2D retains a concave portion and a third positive spring 36A is disposed in the concave portion. The third positive spring 36A always provides the moveable iron core 32 with a resiliently urging force toward the valve body 3. The moveable iron core 32 is fitted to a bottomed cylindrical tube 33 in a freely moveable manner.

The fixed iron core 31 fitted to the tube 33 retains a conical-shaped concave portion at its one end which is engaged with a conical surface of the moveable iron core 32. The flange portion 31C is located to the valve body 3 side of the fixed iron core 31 wherein the flange portion 31C serves a part of a main electromagnetic circuit driven by the electromagnetic coil 34 and an end portion located to the valve body 3 side relative to the flange portion 31C defines a rod support portion 31A. This rod support portion 31A is not a part of the main electromagnetic circuit. And a central portion of the fixed iron core 31 is defined as the internal bore 31B with which the solenoid rod portion 2D is fitted in a moveable manner. The inner diameter of the internal bore 31B is arranged to have a certain clearance gap such that the bore 31B does not come into contact with the solenoid rod portion 2, thus the bore 31B loosely fits with the solenoid rod portion 2. On the other hand, an inner diameter of a guide hole 31A1 extending through the center of the rod support portion 31A is arranged to undergo a slide movement relative to the valve body rod portion 2A. The valve body rod portion 2A and the solenoid rod portion 2D are joined with each other at a location where the valve body rod portion 2A further extends out of the guide hole 31A1 to within the internal bore 31B. This enables the suction pressure Ps to act on the end surface 2A2 of the valve body rod portion 2A.

The introduction hole 17A is allowed to communicate with the internal bore 31B through a plurality of communication passage holes which radially extend from the outer perimeter surface of the fixed iron core 31. Therefore, regions surrounding the fixed iron core 31, moveable iron core 32 and the third positive spring 36A are kept under suction pressure Ps flowing in from the pressure sensing chamber 17. In the valve chamber 4, a force acted on the cross section of the valve body rod portion 2A by the discharge pressure Pd in a direction of the solenoid rod portion 2D approximately offsets another force acted on the seal surface of the valve seat 13 of the valve body rod portion 2A by the discharge pressure Pd in a direction of the pressure sensing rod 2B, thus an influence of the discharge pressure Pd in the valve chamber 4 can be neglected. This implies that the operating rod 2 can be controlled by the suction pressure Ps alone without being affected by the discharge pressure Pd.

An electromagnetic coil 34 is located in the outer circumference of the tube 33. The solenoid portion 30 is mainly constituted by the electromagnetic coil 34, the moveable iron core 32 and the fixed iron core 31. The solenoid portion 30 controls the opening degree of the valve body 3 by driving the moveable iron core 32 based on an electric current supplied to the electromagnetic coil 34. In this case, the suction pressure Ps acted on the pressure sensing device 20 simultaneously affects the opening degree of the valve body 3 as well. In a capacity control valve 1 of this kind, the valve body 3 is opened or closed not only by the operation of the solenoid portion 30 according to the electric current supplied but also by the operation of the pressure sensing device 20 due to suction pressure Ps wherein the action of the valve body 3 modulates pressure within the control chamber by adjusting the fluid flow of the discharge pressure Pd to be introduced to the control chamber.

Figure 2:
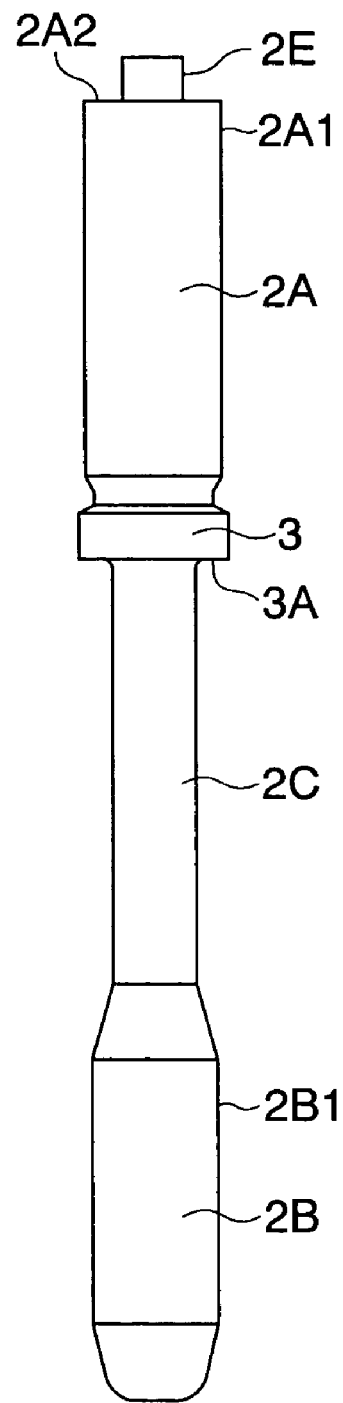
FIG. 2 is an enlarged front view of an operating rod shown in FIG. 1.

FIG. 2 shows the valve body rod portion 2A of the operating rod 2 given in FIG. 1. As shown in FIG. 1, the operating rod 2 undergoes a sliding movement at the sliding surface 2A1 of the valve body rod portion 2A against the guide hole 31A1. Also the sliding surface 2B1 of the pressure sensing rod portion 2B is subject to a sliding movement against the sliding hole 12. Low temperature surface hardening treatment, however, is applied to the sliding surface 2A1 and the sliding surface 2B1, thus bending in the longitudinal length or distortion in roundness of the operating rod 2 can be prevented. Wear on the sliding surface 2A1 and the sliding surface 2B1 also is prevented. Further, friction during the operation of the operating rod 2 is decreased as well. The operating rod 2 is made of stainless steel. A circular stainless steel rod is machined to fabricate a form shown in FIG. 2. The surface of the operating rod 2 is processed with a low temperature surface hardening treatment in order to increase the surface hardness. In doing so, the operating rod 2 fabricated as shown in FIG. 2 is degreased as the first step by a degreasing process.

Next, the operating rod 2 is heat treated at the temperature of as low as 480° C. for approximately 120 minutes after preheating and then is oil-cooled. Heat treatment temperature is preferably no more than 500° C. and the duration is in a range of from 20 to 120 minutes. The heat treatment period varies depending on the mass and the thickness of surface treatment of the operating rod 2. The surface may be polished after the heat treatment from necessity by means of barrel finishing or shot-peening. Finally a cleansing process concludes the entire process. In this surface hardening process, its hardening depth from the surface is less than $8\times10^{-6}$ m and a deformation of the shape of the operating rod 2 is hardly recognizable. As far as the roundness is concerned, before heat treatment and after heat treatment are, respectively, $0.28$-$0.46\times10^{-6}$ m and $0.37$-$0.47\times10^{-6}$ m. Thus the operating rod 2 hardly suffers from any distortion caused by heat treatment. And when the operating rod 2 is in operation, a leakage of the control fluid through mating sliding surfaces is negligible. Also anti-abrasion capability and anti-burning performance of the operating rod 2 under a sliding movement improves.

As a comparison example relative to a conventional nitriding treatment wherein an operating rod, which is made of austenite stainless steel and heat treated at 570° C. for 90 minutes, forms a nitrided layer (black layer) at the surface of the operating rod which mainly contains nitrided chrome, thus anti-corrosion performance of the stainless steel will decrease. Also the nitrided layer resulted from the nitriding treatment requires grinding finish with a grinding stone for a practical use of the operating rod 2. Such a requirement leads to an increase in the production cost, which may in turn cause a loss of marketability. Further, stainless steel treated by a conventional quenching process must be followed by an annealing process which inevitably decreases the hardness of the sliding surface of the operating rod. An operating rod 2 of the present invention which is made of the same material and processed by a low temperature surface hardening treatment at 480° C. for 90 minutes (for example, an equivalent method to Palsonite which is a product's name of a nitriding process developed by Nihon Parkerizing Co., Ltd.), does not show an existence of black layers at its surface (the surface of the operating rod 2 in this case is called "white layer" instead). This does not require grinding finish with a grinding stone thereafter and hence its machining coat can be reduced by applying a massive, finishing method to the surfaces of the operating rods 2 such as shot-peening, honing or barrel polishing. Also a surface hardness as well as an anti-corrosion performance thereof can be improved.

The white layer formed at the surface of the operating rod 2 due to the low temperature surface hardening treatment is not magnetized and does no harm to the magnetic property of austenite stainless steel, thus no iron powder is attracted to the surface of the operating rod 2. This decreases a slide friction of the sliding surface of the operating rod 2 and improves an operational response of the operating rod 2. The low temperature surface hardening treatment used is a nitriding method conducted under no more than 530° C., preferably no more than 500° C. A material candidate for the operating rod 2 includes a structure steel alloy, tool steel, high-speed steel and stainless steel. Use of stainless steel for the operating rod 2, however, forms a white layer which is not magnetized and does no harm to its magnetic property. This further is capable of enhancing not only the surface hardness but also the anti-corrosion performance. Also anti-sticking as well as anti-galling (resistance against wear due to mutual galling) under sliding movement of the sliding surface is improved and an outstanding response of the operating rod 2 under operation is exhibited.

Figure 3:
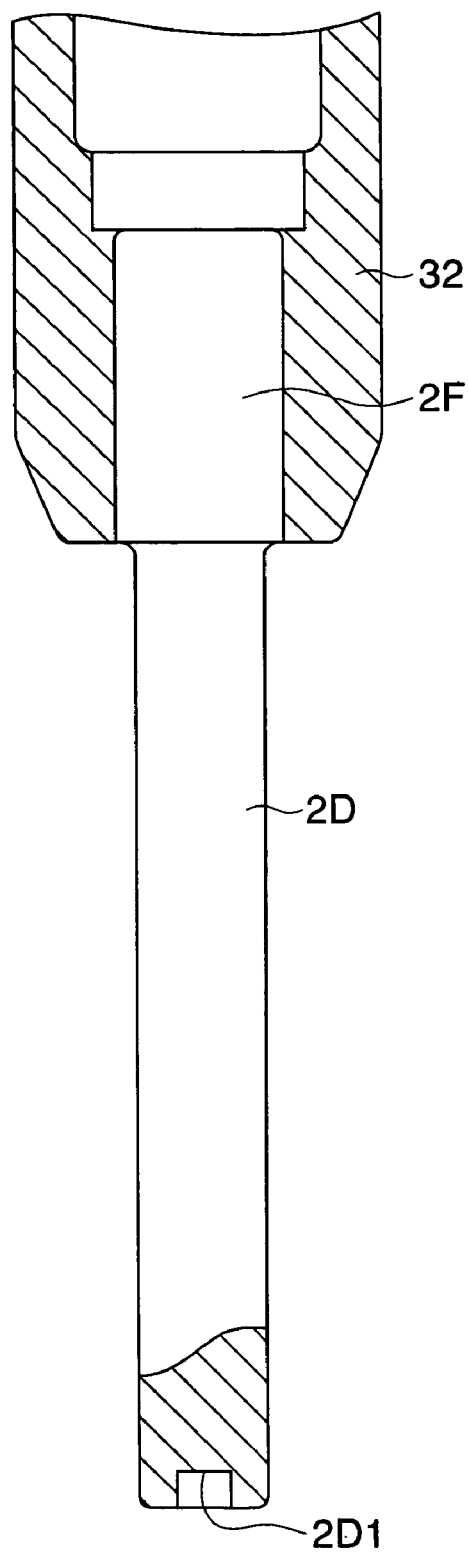
FIG. 3 is an enlarged front view of a solenoid rod portion shown in FIG. 1.

FIG. 3 shows an example of a joint portion 2F of the solenoid rod portion 2D in FIG. 1 fitted to a mounting bore of the moveable iron core 32. Although the solenoid rod portion 2D is a part of the operating rod 2, an engagement hole 2D1 is arranged at the end of the solenoid rod portion 2D of this example such that the valve body rod portion 2 can be connected therewith. Surface of the solenoid rod portion 2D does not need a low temperature surface hardening treatment unless it is brought into contact. If it is subject to a relative sliding movement, however, a low temperature surface hardening treatment stated above can be utilized as well. The white layer surface finish of the solenoid rod portion 2D is good enough from the operational point of view with no need of extra surface finishing process. Also the white layer of the operating rod 2 is not magnetized and does no harm to the magnetic property of the solenoid portion 30.

Figure 4:
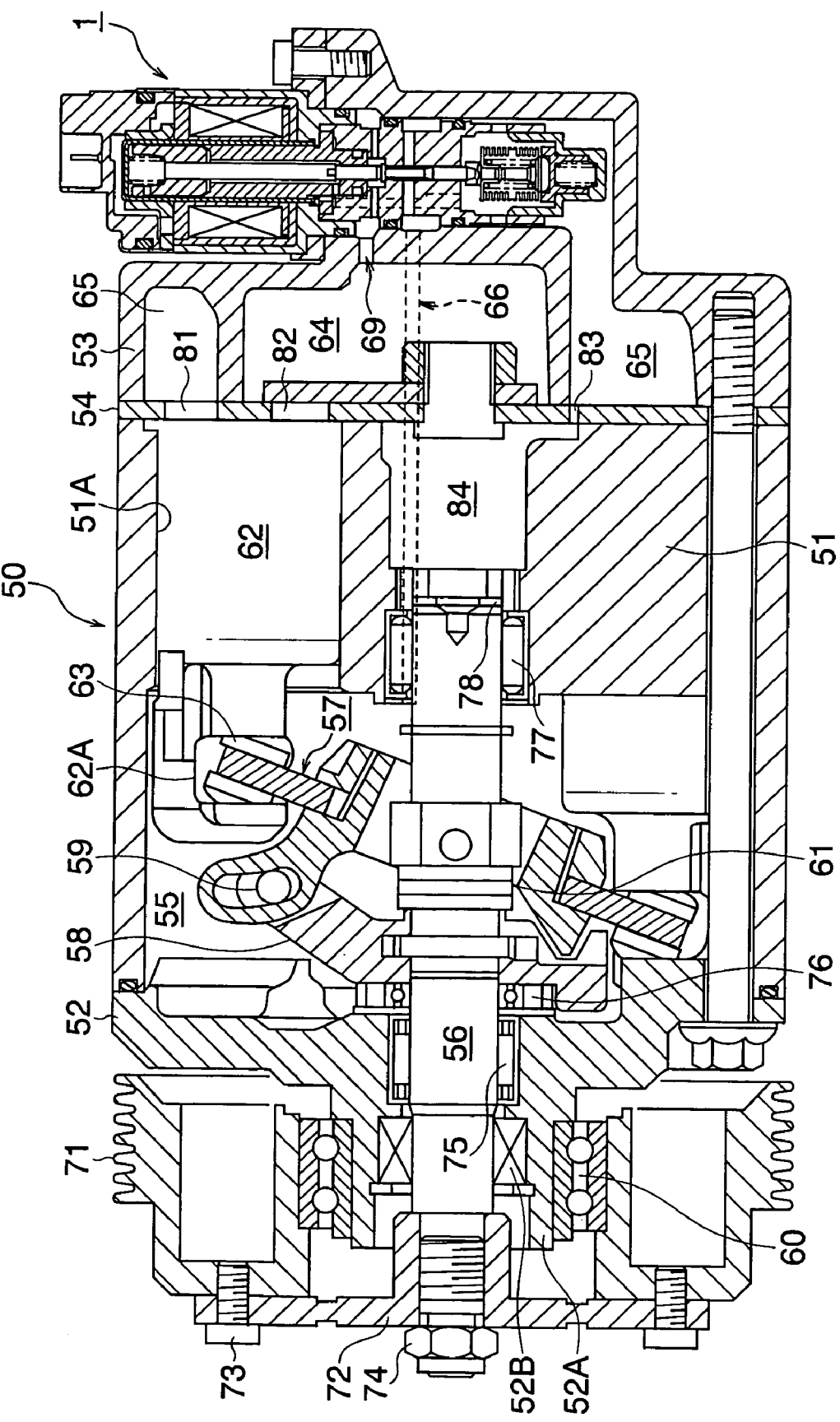
FIG. 4 is a cross sectional view of a capacity control valve relative to the present invention attached to a variable displacement compressor.
Figure 5:
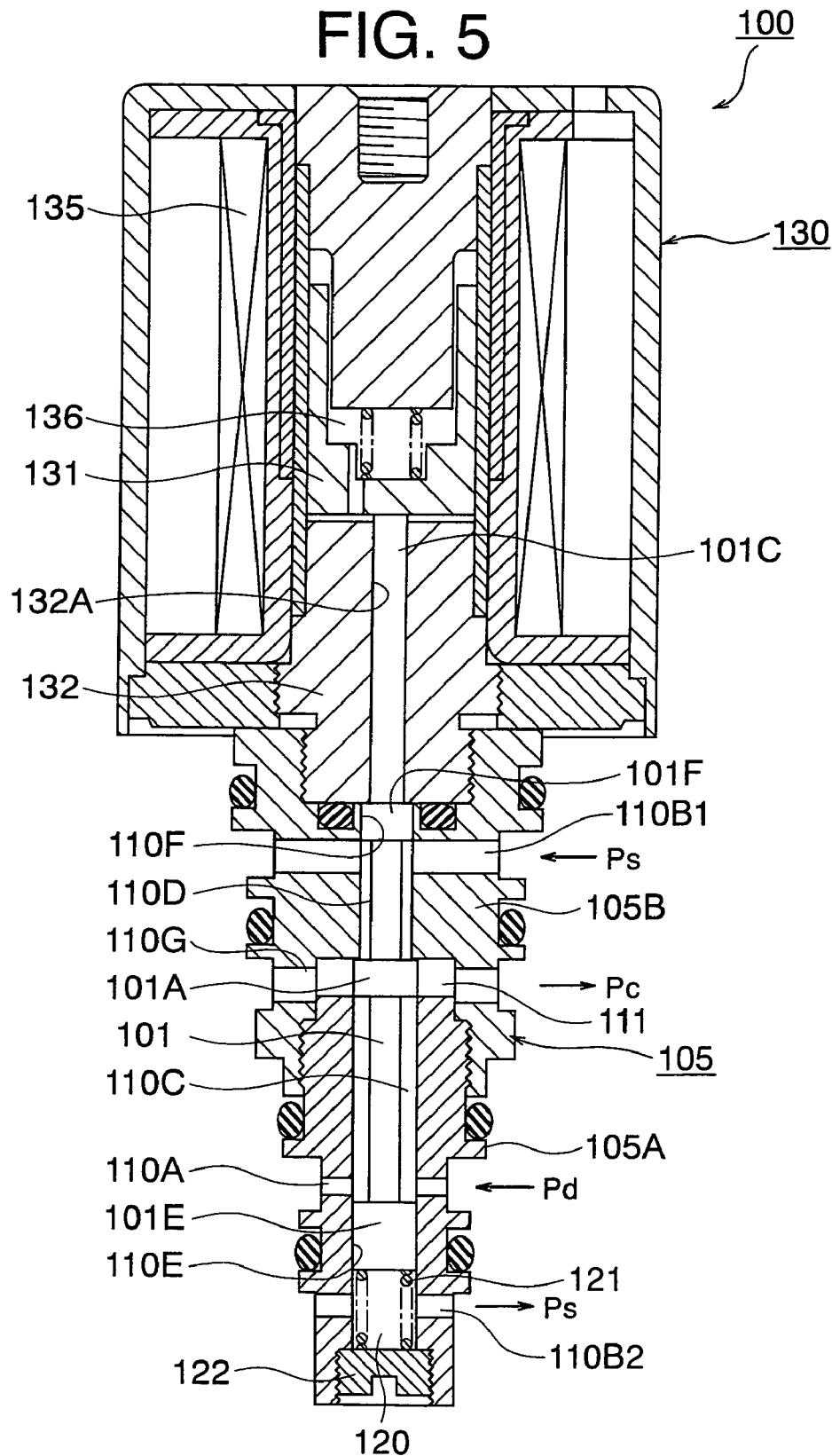
FIG. 5 is a cross sectional view of a control valve for a variable displacement compressor as a relative art similar to the present invention.

FIG. 4 shows a cross section of a compressor mounting a capacity control valve 1 of the present invention therein. The compressor 50 in FIG. 4 retains a cylinder block 51 which disposes a plurality of cylinder bores 51A therein, a front housing 52 being defined at one end of the cylinder block 51, and a rear housing 53 being connected via a valve plate 54 to the cylinder block 51.

The cylinder block 51 and the front housing 52 define a crank chamber 55 therein and the crank chamber 55 disposes a longitudinally extending drive shaft 56 therein. A swash plate 57 is arranged in the circumference about the driving shaft 56. The swash plate 57 is connected via a joint portion to a rotor 58 which is securely fixed to the driving shaft 56 such that the inclined angle of the swash plate 57 relative to the driving shaft 56 can be modulated.

One end of the driving shaft 56 extends to an external environment through the internal of the boss portion which is protruding outward from the front housing 52. Front end portion of the driving shaft 56 defines a screw thread to which a nut 74 is fastened in order to fixate a power transmission plate 72. Also a belt wheel 71 is disposed through a bearing 60 in the outer circumference of the boss portion 52A. The belt wheel 71 is joined with the power transmission plate 72 through fixing bolts 73. This means that rotating the belt wheel 71 implies rotation of the driving shaft 56. An oil seal 52B is disposed between the driving shaft 56 and the boss portion 52A in order to provide a seal between the internal and the external with respect to the front housing 52. The other end of the driving shaft 56 is located within the cylinder block 51, being supported by a support portion 78. Bearings 75, 76, 77 which are arranged in parallel to the driving shaft 56 provide a support to the driving shaft 56 in a rotatable manner.

Each cylinder bore 51A contains a piston 62 therewithin. A hollow portion 62A located in one internal end of the piston 62 accommodates a space for the outer perimeter portion of a swash plate 57. An outer circumferential portion of the swash plate 57 is arranged to move together with the piston 62 through a shoe 63. Within the rear housing 53, a discharge chamber 64 and a suction chamber 65 are separately located. Suction chamber 65 and the cylinder bore 51A communicate with each other through a suction port 81 disposed in a valve plate 54 and a suction valve which does not appear in the figure. Discharge chamber 64 and the cylinder bore 51A communicate with each other through a discharge valve which is not shown in the figure and a discharge port 82 disposed in the valve plate 54.

A capacity control valve 1 is installed in a hollow which is formed inside the rear wall of the rear housing 53. The capacity control valve 1 controls the fluid under discharge pressure Pd flowing to the crank chamber 55 by adjusting the opening degrees of a fluid communication passage 69 for discharge pressure Pd which communicates with the discharge chamber 64 as well as of a fluid communication passage 66 for crank pressure Pc which communicates with the crank chamber 55. Also the fluid under crank chamber pressure Pc within the crank chamber 55 reaches the suction chamber 65 through between the other end of the driving shaft 56 and the bearing 77, a fluid chamber 84 and a fixed orifice 83. As a result, the capacity control valve 1 becomes capable of adjusting the opening degrees of the fluid communication passage 69 for discharge pressure Pd as well as of the fluid communication passage 66 for crank pressure Pc, which causes changes in the crank chamber pressure Pc and allows stroke of the pistons 62 to be modulated.

Other preferred embodiments relative to the present invention will be described below.

A capacity control valve as a preferred embodiment related to a second invention retains a guide hole as a part of a fixed iron core of a solenoid portion wherein the guide hole is located at such a position that a magnetic circuit of the solenoid portion does not pass through the guide hole.

In the capacity control valve related to the second invention, iron powders or the like are prevented from being attracted to the guide hole. This ensures a prevention of malfunctioning of the operating rod due to iron powders or the like and an exhibition of an outstanding response of the operating rod in the control of process fluid.

A capacity control valve as a preferred embodiment related to a third invention retains an introduction hole to make an internal bore and a pressure sensing chamber containing a pressure sensing device communicate with each other wherein a solenoid rod portion and an operating rod are defined as two separate components within the internal bore both of which are integrally joined with each other at the division end surface.

In the capacity control valve related to the third invention, the solenoid rod portion can be arranged nonmagnetic and the operating rod can be made of nonmagnetic material of a different kind which is suitable to the valve body because the solenoid rod portion and the operating rod are two separate components. This not only improves anti-corrosive capability of the valve body but also decreases the sliding friction during operation. Further, a suction pressure differential between the both end portions of the operating rod can be offset by making an arrangement such that the suction pressure acts on the both end faces. By doing this, the response accuracy of the operating rod due to suction pressure will improve.

A capacity control valve as a preferred embodiment related to a fourth invention disposes a flange portion in an outer circumferential portion of a fixed iron core and the flange portion is located closer to an electromagnetic coil than the guide hole.

In the capacity control valve related to the fourth invention, disposing the flange portion closer to the electromagnetic coil than the guide hole makes it possible to form a magnetic circuit passing through the fixed iron core, but away from the guide hole. This effectively prevents iron powders or the like from being attracted to the magnetized guide hole.

A capacity control valve as a preferred embodiment related to a fifth invention, an operating rod is made of stainless steel.

In the capacity control valve related to the fifth invention, use of stainless steel for the operating rod and a low temperature surface hardening treatment applied to it leads to a formation of nonmagnetic white layer on the surface, thus no harm is given to the magnetic properties of the solenoid portion. Although even a conventional nitrided layer in stainless steel suffer from a lowered anti-corrosion, the white layer formed by a low temperature surface hardening treatment does not damage anti-corrosion. Therefore, the operating rod is capable of maintaining anti-corrosive property, improving the surface hardness and anti-sticking and enhancing its bending strength.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

A capacity control valve 1 of the present invention, as mentioned above, is very effective for a pressure regulation of a control chamber in pneumatic machines, compressors or the like. More particularly, the capacity control valve exhibits an outstanding operational response of the operating rod, a high anti-abrasive property of relative sliding portions of the operating rod and a low production cost of the operating rod.

What is claimed is:

1. A capacity control valve having a solenoid portion at an end of a valve housing, said solenoid portion comprising an electromagnetic coil, a moveable iron core and a fixed iron core, said capacity control valve comprising:
    a solenoid rod portion having a joint portion fixedly connected to said moveable iron core of said solenoid portion;
    an operating rod connected to said solenoid rod portion;
    a valve body defined on said operating rod, said valve body opening or closing a control fluid passage hole; and
    a pressure sensing device for activating said operating rod;
    wherein said fixed iron core is arranged opposite relative to said moveable core, and comprises a flange portion and a rod support portion, said flange portion being located on a valve body side thereof in a main electromagnetic circuit driven by said electromagnetic coil, said flange portion serving a part of said main electromagnetic circuit, said rod support portion being positioned further away from said moveable iron core relative to said flange portion and outside of said main electromagnetic circuit, said rod support portion having a guide hole formed through a center of said rod support portion for guiding said operating rod through said guide hole in a freely moveable manner by slide movement, said rod support portion being located at a position wherein said guide hole is free from being encompassed by said electromagnetic coil of the solenoid portion;
    wherein an outer circumference of said operating rod is made of austenite stainless steel subjected to a nitriding hardening treatment, and
    wherein said valve housing comprises a mounting bore for mounting said fixed iron core, a pressure sensing chamber equipped with said pressure sensing device provided therein, an introduction hole communicating with an internal bore through which said operating rod longitudinally extends and said pressure sensing chamber, and a large diameter portion of said mounting bore being formed to receive said flange portion of said fixed iron core.

2. The capacity control valve according to claim 1, wherein said solenoid rod portion and said operating rod are disposed within said internal bore and integrally joined to each other at a division end surface.

* * * * *